(12) United States Patent
Morgan et al.

(10) Patent No.: US 9,035,756 B2
(45) Date of Patent: May 19, 2015

(54) METHODS AND SYSTEMS RELATED TO REMOTE TAMPER DETECTION

(71) Applicant: **Gordon*Howard Associates, Inc.**, Littleton, CO (US)

(72) Inventors: Gerald A. Morgan, Littleton, CO (US); Stanley G. Schwarz, Indialantic, FL (US); Christopher M. Macheca, Centennial, CO (US)

(73) Assignee: **GORDON*HOWARD ASSOCIATES, INC.**, Littleton, CO (US)

( * ) Notice: Subject to any disclaimer, the term of this patent is extended or adjusted under 35 U.S.C. 154(b) by 275 days.

(21) Appl. No.: 13/828,832

(22) Filed: Mar. 14, 2013

(65) Prior Publication Data

US 2014/0266652 A1    Sep. 18, 2014

(51) Int. Cl.
*B60R 25/10*    (2013.01)
*B60R 25/00*    (2013.01)

(52) U.S. Cl.
CPC ...................................... *B60R 25/00* (2013.01)

(58) Field of Classification Search
CPC ...... B60R 25/04; B60R 25/102; B60R 25/33; B60R 25/00; B60K 28/063
USPC .............. 340/426.1, 426.13, 426, 18, 426.19, 340/576, 572.1, 10.1; 705/1.1, 13, 38; 701/29.1, 51, 408, 468
See application file for complete search history.

(56) References Cited

U.S. PATENT DOCUMENTS

| | | | |
|---|---|---|---|
| 4,335,370 A | 6/1982 | Scalley et al. | |
| 4,592,443 A | 6/1986 | Simon | |
| 4,624,578 A | 11/1986 | Green | |
| 4,688,026 A | 8/1987 | Scribner et al. | |
| 4,700,296 A | 10/1987 | Palmer, Jr. et al. | |
| 4,738,333 A | 4/1988 | Collier et al. | |
| 4,800,590 A | 1/1989 | Vaughan | |
| 5,014,206 A | 5/1991 | Scribner et al. | |
| 5,132,968 A | 7/1992 | Cephus | |
| 5,228,083 A | 7/1993 | Lozowick et al. | |
| 5,426,415 A | 6/1995 | Prachar et al. | |

(Continued)

FOREIGN PATENT DOCUMENTS

| | | |
|---|---|---|
| EP | 1557807 | 7/2005 |
| WO | 9616845 | 6/1996 |

(Continued)

OTHER PUBLICATIONS

US 5,699,633, 10/1999, Roser (withdrawn).

(Continued)

*Primary Examiner* — Thomas Mullen
(74) *Attorney, Agent, or Firm* — Conley Rose, P.C.

(57) ABSTRACT

Remote tamper detection. At least some of the example embodiments are methods including: receiving Global Positioning System (GPS) signals indicative of a location, the receiving by a first device coupled to an asset; periodically sending a signal of operability between the first device and a second device, the second device coupled to the asset, and the second device configured to selectively disable the asset; determining that receipt of the signal of operability has ceased; and then issuing an indication of the location of the first device responsive to the determining that receipt of the signal of operability has ceased, the issuing from the first device by a wireless transmission to a remote operations center.

5 Claims, 5 Drawing Sheets

(56) References Cited

U.S. PATENT DOCUMENTS

| | | |
|---|---|---|
| 5,490,200 A | 2/1996 | Snyder et al. |
| 5,495,531 A | 2/1996 | Smiedt |
| 5,510,780 A | 4/1996 | Norris et al. |
| 5,619,573 A | 4/1997 | Brinkmeyer et al. |
| 5,673,318 A | 9/1997 | Bellare et al. |
| 5,708,712 A | 1/1998 | Brinkmeyer et al. |
| 5,775,290 A | 7/1998 | Staerzi et al. |
| 5,797,134 A | 8/1998 | McMillan et al. |
| 5,818,725 A | 10/1998 | McNamara et al. |
| 5,819,869 A | 10/1998 | Horton |
| 5,898,391 A | 4/1999 | Jefferies et al. |
| 5,917,405 A | 6/1999 | Joao |
| 5,970,143 A | 10/1999 | Schneier et al. |
| 6,025,774 A | 2/2000 | Forbes |
| 6,026,922 A | 2/2000 | Horton |
| 6,032,258 A | 2/2000 | Godoroja et al. |
| 6,064,970 A | 5/2000 | McMillan et al. |
| 6,088,143 A | 7/2000 | Bang |
| 6,130,621 A | 10/2000 | Weiss |
| 6,157,317 A | 12/2000 | Walker |
| 6,185,307 B1 | 2/2001 | Johnson, Jr. |
| 6,195,648 B1 | 2/2001 | Simon et al. |
| 6,249,217 B1 | 6/2001 | Forbes |
| 6,278,936 B1 | 8/2001 | Jones |
| 6,353,776 B1 | 3/2002 | Rohrl et al. |
| 6,370,649 B1 | 4/2002 | Angelo et al. |
| 6,380,848 B1 | 4/2002 | Weigl et al. |
| 6,401,204 B1 | 6/2002 | Euchner et al. |
| 6,429,773 B1 | 8/2002 | Schuyler |
| 6,489,897 B2 | 12/2002 | Simon |
| 6,587,739 B1 | 7/2003 | Abrams et al. |
| 6,601,175 B1 | 7/2003 | Arnold et al. |
| 6,611,201 B1 | 8/2003 | Bishop et al. |
| 6,611,686 B1 | 8/2003 | Smith et al. |
| 6,615,186 B1 | 9/2003 | Kolls |
| 6,665,613 B2 | 12/2003 | Duvall |
| 6,714,859 B2 | 3/2004 | Jones |
| 6,717,527 B2 | 4/2004 | Simon |
| 6,741,927 B2 | 5/2004 | Jones |
| 6,804,606 B2 | 10/2004 | Jones |
| 6,812,829 B1 | 11/2004 | Flick |
| 6,816,089 B2 | 11/2004 | Flick |
| 6,816,090 B2 | 11/2004 | Teckchandani et al. |
| 6,828,692 B2 | 12/2004 | Simon |
| 6,868,386 B1 | 3/2005 | Henderson et al. |
| 6,870,467 B2 | 3/2005 | Simon |
| 6,873,824 B2 | 3/2005 | Flick |
| 6,888,495 B2 | 5/2005 | Flick |
| 6,917,853 B2 | 7/2005 | Chirnomas |
| 6,924,750 B2 | 8/2005 | Flick |
| 6,950,807 B2 | 9/2005 | Brock |
| 6,952,645 B1 | 10/2005 | Jones |
| 6,961,001 B1 | 11/2005 | Chang et al. |
| 6,972,667 B2 | 12/2005 | Flick |
| 6,985,583 B1 | 1/2006 | Brainard et al. |
| 6,993,658 B1 | 1/2006 | Engberg et al. |
| 7,005,960 B2 | 2/2006 | Flick |
| 7,015,830 B2 | 3/2006 | Flick |
| 7,020,798 B2 | 3/2006 | Meng et al. |
| 7,031,826 B2 | 4/2006 | Flick |
| 7,031,835 B2 | 4/2006 | Flick |
| 7,039,811 B2 | 5/2006 | Ito |
| 7,053,823 B2 | 5/2006 | Cervinka et al. |
| 7,061,137 B2 | 6/2006 | Flick |
| 7,091,822 B2 | 8/2006 | Flick et al. |
| 7,103,368 B2 | 9/2006 | Teshima |
| 7,123,128 B2 | 10/2006 | Mullet et al. |
| 7,124,088 B2 | 10/2006 | Bauer et al. |
| 7,133,685 B2 | 11/2006 | Hose et al. |
| 7,149,623 B2 | 12/2006 | Flick |
| 7,205,679 B2 | 4/2007 | Flick |
| 7,224,083 B2 | 5/2007 | Flick |
| 7,266,507 B2 | 9/2007 | Simon et al. |
| 7,299,890 B2 | 11/2007 | Mobley |
| 7,323,982 B2 | 1/2008 | Staton et al. |
| 7,327,250 B2 | 2/2008 | Harvey |
| 7,379,805 B2 | 5/2008 | Olsen, III et al. |
| 7,389,916 B2 | 6/2008 | Chirnomas |
| 7,561,102 B2 | 7/2009 | Duvall |
| 7,823,681 B2 | 11/2010 | Crespo et al. |
| 7,873,455 B2 | 1/2011 | Arshad et al. |
| 7,877,269 B2 | 1/2011 | Bauer et al. |
| 7,930,211 B2 | 4/2011 | Crolley |
| 8,018,329 B2 | 9/2011 | Morgan et al. |
| 8,095,394 B2 | 1/2012 | Nowak et al. |
| 8,140,358 B1 | 3/2012 | Ling et al. |
| 8,217,772 B2 | 7/2012 | Morgan et al. |
| 8,370,027 B2 | 2/2013 | Pettersson et al. |
| 2001/0040503 A1 | 11/2001 | Bishop |
| 2002/0019055 A1 | 2/2002 | Brown et al. |
| 2002/0193926 A1 | 12/2002 | Katagishi et al. |
| 2003/0036823 A1 | 2/2003 | Mahvi |
| 2003/0151501 A1 | 8/2003 | Teckchandani et al. |
| 2003/0191583 A1 | 10/2003 | Uhlmann et al. |
| 2004/0088345 A1 | 5/2004 | Zellner et al. |
| 2004/0153362 A1 | 8/2004 | Bauer et al. |
| 2004/0176978 A1 | 9/2004 | Simon et al. |
| 2004/0177034 A1 | 9/2004 | Simon et al. |
| 2004/0203974 A1 | 10/2004 | Seibel |
| 2004/0204795 A1 | 10/2004 | Harvey et al. |
| 2004/0239510 A1 | 12/2004 | Karsten |
| 2005/0017855 A1 | 1/2005 | Harvey |
| 2005/0033483 A1 | 2/2005 | Simon et al. |
| 2005/0134438 A1 | 6/2005 | Simon |
| 2005/0162016 A1 | 7/2005 | Simon |
| 2005/0270178 A1 | 12/2005 | Ioli |
| 2006/0059109 A1 | 3/2006 | Grimes |
| 2006/0108417 A1 | 5/2006 | Simon |
| 2006/0111822 A1 | 5/2006 | Simon |
| 2006/0122748 A1 | 6/2006 | Nou |
| 2006/0136314 A1 | 6/2006 | Simon |
| 2007/0010922 A1 | 1/2007 | Buckley |
| 2007/0176771 A1 | 8/2007 | Doyle |
| 2007/0185728 A1 | 8/2007 | Schwarz et al. |
| 2007/0194881 A1 | 8/2007 | Schwarz et al. |
| 2008/0114541 A1 | 5/2008 | Shintani et al. |
| 2008/0162034 A1 | 7/2008 | Breen |
| 2008/0221743 A1 | 9/2008 | Schwarz et al. |
| 2009/0043409 A1 | 2/2009 | Ota |
| 2009/0182216 A1 | 7/2009 | Roushey, Iii et al. |
| 2010/0148947 A1 | 6/2010 | Morgan et al. |
| 2010/0268402 A1 | 10/2010 | Schwarz et al. |
| 2011/0050407 A1 | 3/2011 | Schoenfeld et al. |
| 2011/0057800 A1 | 3/2011 | Sofer |
| 2011/0084820 A1 | 4/2011 | Walter et al. |

FOREIGN PATENT DOCUMENTS

| | | |
|---|---|---|
| WO | 2007092272 | 8/2007 |
| WO | 2007092287 | 8/2007 |
| WO | 2010/068438 A2 | 6/2010 |

OTHER PUBLICATIONS

ON TIME Payment Protection Systems, printed Jan. 2, 2004 from www.ontime-pps.com/how.html.
Aircept Products, printed Jan. 2, 2004 from www. aircept. com/products.html.
How PayTeck Works, printed Jan. 2, 2004 from www. payteck.cc/aboutpayteck.html.
Article: "Pager Lets You Locate Your Car, Unlock and Start It", published Dec. 10, 1997 in USA Today.
Article: "Electronic Keys Keep Tabs on Late Payers", published Sep. 22, 1997 in Nonprime Auto News.
Article: "PASSTEC Device Safely Prevents Vehicles from Starting", published Jul. 19, 1999 in Used Car News.
Payment Clock Disabler advertisement, published, May 18, 1998.
Secure Your Credit & Secure Your Investment (Pay Teck advertisement), printed Jan. 2, 2004 from www. payteck.cc.
iMetrik Company Information, printed Dec. 21, 2006 from imetrik.com.
About C-CHIP Technologies, printed Dec. 21, 2006 from www.c-chip.com.

(56) References Cited

OTHER PUBLICATIONS

Hi-Tech tools to solve traditional problems, printed Dec. 21, 2006 from www.c-chip.com.

C-CHIP Technologies Products: Credit Chip 100, Credit Chip 100C, Credit Chip 200, printed Dec. 21, 2006 from www. c-chip.com.
The Credit Chip 100, printed Dec. 21, 2006 from www.c-chip.com.
EEC-EN0F204RK Panasonic Electronic Components | P14164CT-ND | DigiKey. Web. Accessed Feb. 13, 2013. www.digikey.com/product-detail/en/EEC-EN0F204RK/P14164CT-ND/1937322.

US 9,035,756 B2

METHODS AND SYSTEMS RELATED TO REMOTE TAMPER DETECTION

BACKGROUND

In situations where an individual has obtained financing for an asset, such as a vehicle, financing institutions may be interested tracking the location of the asset. Tracking the location of the asset may be beneficial in ensuring the borrower does not abscond with the asset, or otherwise fails to make payments. Thus, advancements in tracking financed assets may result in a lower payment default.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

"Remote" shall mean one kilometer or more.

"Supercapacitor" shall mean one or more electrical components, either alone or in parallel having a capacitance density of at least 3.0 millifarads per cubic millimeter ($mF/mm^3$).

"Periodically," in reference to sending a signal, shall mean a recurring action, but shall not require each action to occur at equal intervals of time.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to systems and methods of detecting tampering of at least one onboard device coupled to a vehicle. In particular, two devices installed within a vehicle are communicatively linked, and if the link is determined to have been improperly broken, alerts and/or actions are subsequently taken. The developmental context is detecting tampering with at least one onboard device used to aid in ensuring payment on a vehicle loan, and thus the specification will be based on the development context; however, the developmental context shall not be read as a limitation as to the applicability of the various embodiments, as the methods described herein may apply to other tamper detecting scenarios for other mobile and non-mobile assets. The specification first turns to a high level system overview.

Figure 1:
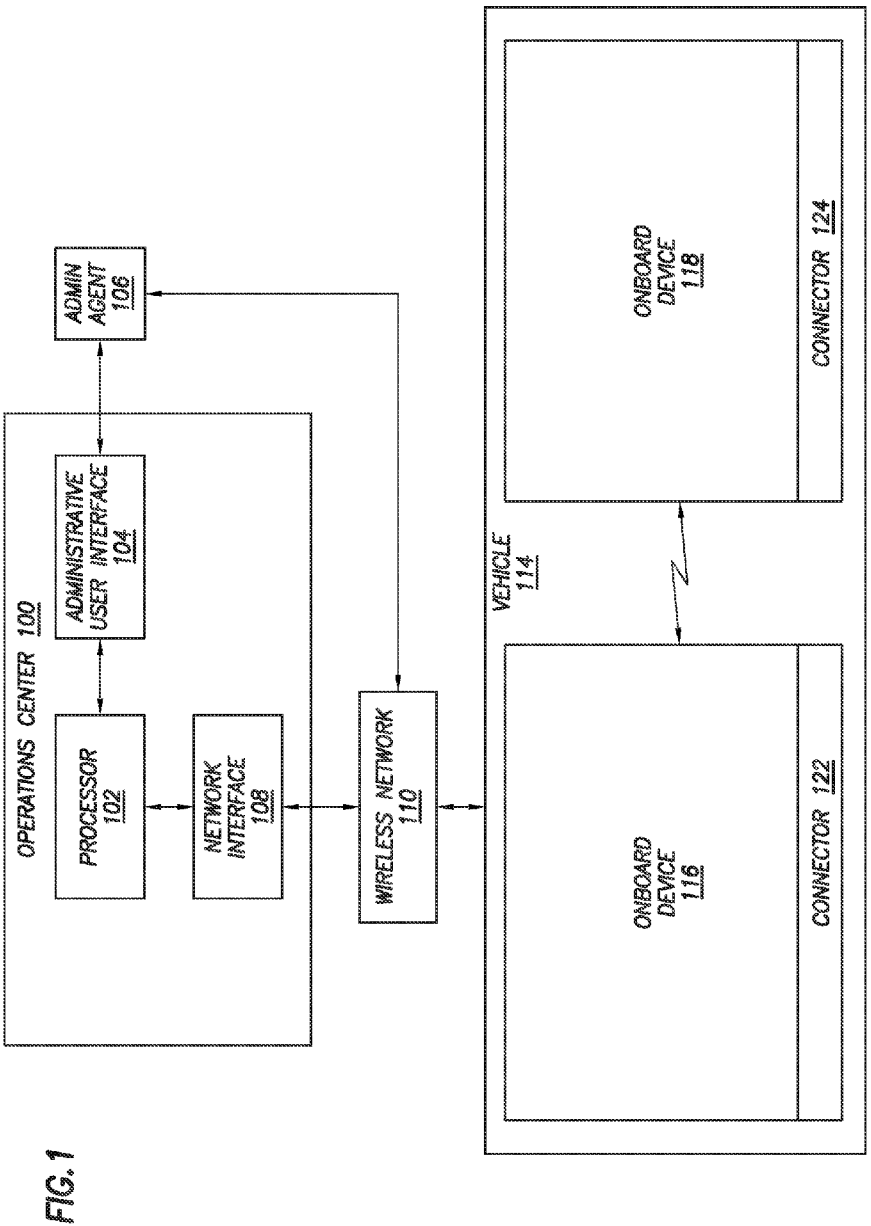
FIG. 1 shows, in block diagram form, a system in accordance with at least some embodiments.

FIG. 1 shows, in block diagram form, a system in accordance with at least some embodiments. In particular, the system comprises an operations center 100 communicatively coupled to a vehicle 114 by way of a wireless network 110. The operations center 100 comprises a processor 102. In some embodiments, the processor 102 may be a stand-alone computer system, or the processor may comprise a plurality of computer systems communicatively coupled and performing the functions of the operations center 100, the functions discussed more thoroughly below. The processor 102 may couple to an administrative user interface 104. The administrative user interface 104 may enable an administrative agent 106 to control or configure the operation of the system.

In one embodiment, in order to communicate with vehicle 114, the operations center 100 may further comprise a network interface 108 communicatively coupled to the processor 102. By way of the network interface 108, the processor 102, and any programs executing thereon, may communicate with vehicle 114, such as by wireless network 110. Wireless network 110 is illustrative of any suitable communications network, such as a cellular network, a Wireless Fidelity (Wi-Fi) network, satellite communication network, or other mechanism, or combinations of mechanisms, for transmitting information between the operations center 100 and the vehicle 114.

In accordance with at least some embodiments, the operations center 100 is remotely located from the vehicle 114. In some cases, the operations center 100 and vehicle 114 may be located within the same city or state. In other cases, the operations center 100 may be many hundreds or thousands of miles from vehicle 114, and thus the illustrative wireless network 110 may span several different types of communication networks.

Still referring to FIG. 1, the system further comprises a vehicle 114 communicatively coupled to operations center 100 by way of the illustrative wireless network 110. The vehicle 114 may comprise at least two onboard devices: illustrative onboard device 116 and illustrative onboard device 118.

At least one, if not both, onboard devices may have location tracking capabilities and/or vehicle disablement capabilities. Tracking the location of the vehicle may be beneficial in many situations. In one example situation, a lending institution financing a vehicle purchase may be interested in the ability to track the vehicle in the event timely payments are not made on the loan. In particular, a driver purchases vehicle 114 by receiving financing from a financing institution (e.g., a bank, a dealership). The financing institution may request that onboard device 116 and/or 118 be installed within vehicle 114 to track the location of the vehicle and/or to disable the vehicle in the event of a non-payment. A driver who has not made a payment, or who is intending not to make a payment, and aware of the possibility of vehicle disablement or repossession may attempt to tamper with the disabling onboard device by removing it from the vehicle, or otherwise disconnecting it. In order to prevent the driver from tampering with the device and thus circumventing the locating tracking and/or disablement capabilities, onboard devices 116 and 118 are placed within different areas of vehicle 114. For example, one onboard device may be located in an inconspicuous location, such as within an electrical compartment under the hood or within the luggage compartment, and the other onboard device may be located in a conspicuous location, such as under the dashboard of the vehicle. By placing the onboard devices in different locations, the driver may not be aware of a second device, or may have difficulty locating the second device.

In order to detect tampering, the onboard devices communicate with each other. In one embodiment, if one or both of the onboard devices detects there is no longer a communicative link between the devices, the lack of a signal may indicate tampering. For example, onboard device 116 may have the capability of sending onboard device 118 a communication related to operability. The onboard device 118 may have the capability of sending a return message to the onboard device 116 acknowledging receipt of the message of operability. In the alternative, onboard device 118 may send the message of operability, whereas onboard device 116 may send the message acknowledging receipt. Thus, onboard devices 116 and 118 have two-way communications capabilities with each other.

Upon receiving a message from the other onboard device, one or both of the onboard devices may take appropriate action, such as sending an alert of tampering, sending an indication of last known location, and/or disabling the vehicle. In order to more fully understand the methods and system associated with detecting tampering and taking subsequent action, the onboard devices will now be described in more detail.

Figure 2:
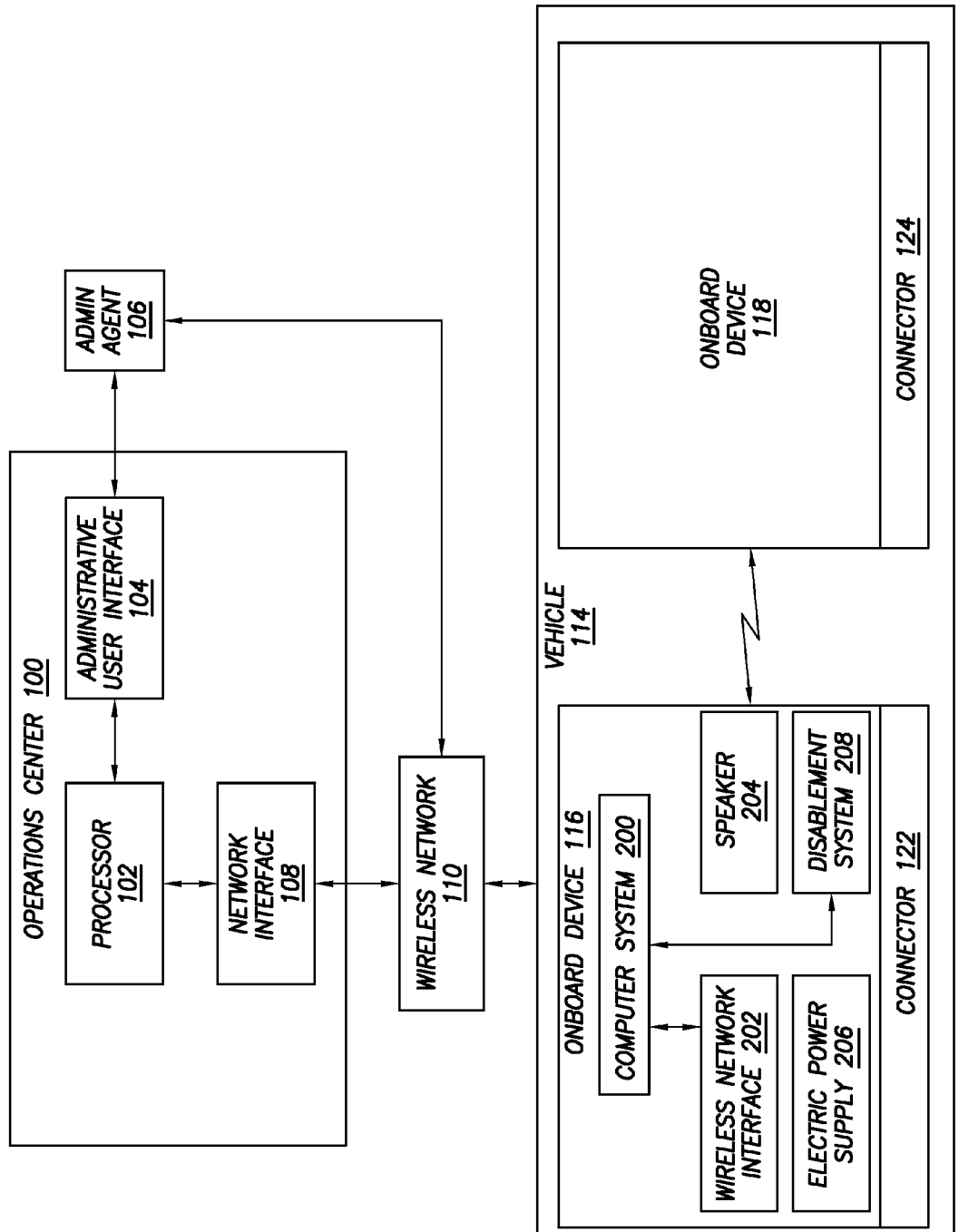
FIG. 2 shows, in block diagram form, a system in accordance with at least some embodiments.

FIG. 2 shows the overall system from FIG. 1 combined with a more detailed depiction of onboard device 116. In particular, onboard device 116 is configured to couple to vehicle 114. Onboard device 116 may be defined as a separately enclosed device both mechanically and electrically coupled to the vehicle 114 by way of connector 122. That is, connector 122 may provide mechanical support that holds the onboard device 116 in place, and/or by way of the connector 122 the onboard device 116 may electrically couple to other components of the vehicle 114. For example, connector 122 may enable coupling between onboard device 116 to the onboard diagnostic version two ("OBD-II") port, thus giving onboard device 116 the ability to communicate with one or more components of the vehicle 114 such as the vehicle computer (not specifically shown), a starter solenoid relay connector, or fuel pump relay connector.

Onboard device 116 may comprise a computer system 200. Although not specifically shown, the onboard device computer system 200 may comprise a processor, where the processor may communicate with subsystems of the vehicle over the connector 122, such as a computer system of the vehicle 114 (not specifically shown). The onboard device 116 configured to couple to the OBD-II port may also have the ability to read or determine data associated with the vehicle 114, such as determining the identity of the vehicle (e.g., by reading the vehicle identification number, hereafter "VIN"), and may also have the ability to command the computer system of the vehicle to disable certain functions (e.g. starter circuit, spark ignition, fuel system) such that the vehicle 114 may be disabled at the command of the onboard device 116, discussed in more detail below.

The onboard device 116 may further comprise a wireless network interface 202 coupled to the computer system 200. By way of the wireless network interface 202, programs executed by the computer system 200 may communicate with other devices. In particular, the wireless network interface 202 may be the interface through which onboard device 116 sends and receives signals of operability and communications to and from onboard device 118. In some embodiments, the wireless network interface 202 enables the computer system 200 to communicate with operations center 100 by way of a wireless transmission through the wireless network 110.

In addition to communications over the wireless network interface 202, onboard device 116 may comprise a speaker 204 which broadcasts sounds received by a microphone coupled to onboard device 118 (discussed more below). The sounds may be alerts indicative of a loss of power or communication, and thus may be indicative of tampering between the devices.

Furthermore, onboard device 116 may comprise a disablement system 208 that can selectively disable the vehicle 114. Disablement may take many forms. For example, the onboard device may disable the vehicle by any suitable technique, such as disabling the ability to crank the engine, disabling the spark ignition system, disabling the fuel pump relay, disabling by way of a starter interrupt, or a combination of disabling mechanisms. In other embodiments, the onboard device 116 may be a relay replacement device. For example, a starter relay is a device within a vehicle that, when activated, provides electrical current to the solenoid of the starter. In the event communication is lost with onboard device 118, the onboard device 116 may not provide current to the solenoid in spite of a command to do so. Thus, connector 122 may be a relay connector. In yet still other cases, the onboard device 116 may be a relay replacement device for any system that could disable the vehicle (e.g., either prevents the motor from starting, or prevents the motor from continuing to operate).

In addition, onboard device 116 may disable vehicle 114 on command from the operations center 100. In particular, the operations center may comprise disablement services described above, and at the request of any authorized entity (e.g., an administrative agent, a lending institution, a dealership), vehicle 114 may be disabled. Onboard device 118 will now be discussed in more detail with reference to FIG. 3.

Figure 3:
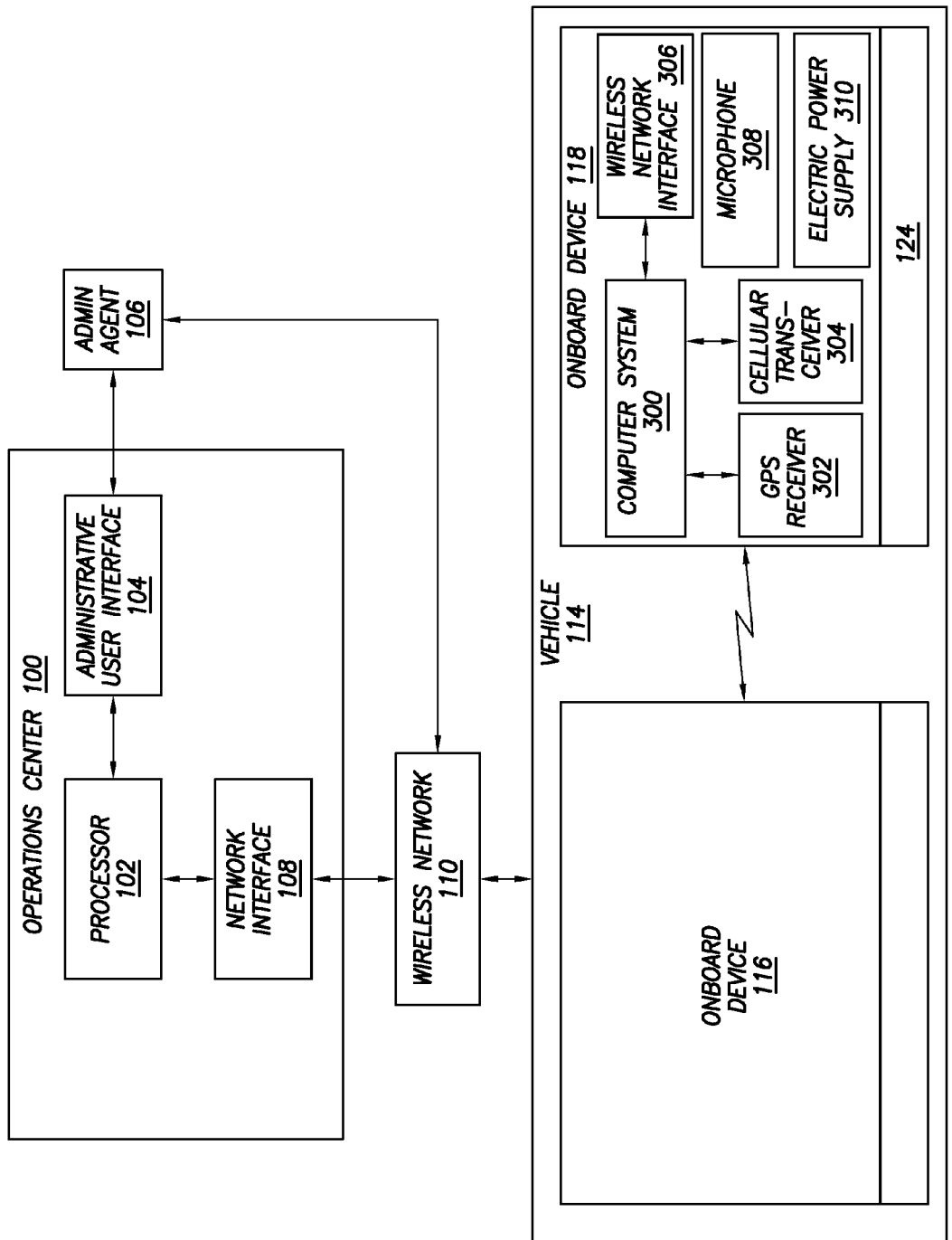
FIG. 3 shows, in block diagram form, a system in accordance with at least some embodiments.

FIG. 3 shows the overall system with a more detailed depiction of onboard device 118. In particular, onboard device 118 is configured to couple to vehicle 114. Like onboard device 116, onboard device 118 is a separately enclosed device distinct from onboard device 116. The onboard device 118 may be both mechanically and electrically coupled to the vehicle 114 by way of connector 124. That is, connector 124 may provide mechanical support that holds the onboard device 118 in place, and/or by way of the connector 124 the onboard device 118 may electrically couple to other components of the vehicle 114. For example, connector 122 may enable coupling between onboard device 118 to the OBD-II port, thus giving onboard device 118 the ability to communicate with one or more components of the vehicle 114 such as the vehicle computer (not specifically shown).

In one embodiment, the onboard device 118 further comprises a global position system (GPS) receiver 302 coupled to onboard computer system 300. The GPS receiver 302 receives signals from an array of GPS satellites orbiting the earth, and based on timing associated with arrival of those signals, a location of the onboard device 118 (and thus the vehicle 114) can be determined. In some cases, the GPS receiver 302 has sufficient functionality to calculate location, and thus the data passed to computer system 300 may be a direct indication of location. In other cases, the functionality to determine location may be shared between the GPS receiver 302 and software executing on the processor 102, by way of wireless network 110. That is, the GPS receiver 302 may receive the plurality of GPS signals and pass the information to a program on the processor 102, which program may then make the determination as to location of the onboard device 118, and thus the vehicle 114.

In one embodiment, the onboard device 118 tracks the vehicle with high precision, thus one may be able to identify the street and block at which the vehicle is passing at any given time (though the onboard device 118 may not necessarily have or contain street level databases). In other cases, the onboard device 118 may act only to determine the endpoints of each trip.

In other embodiments, location determination by the onboard device 118 may be by mechanisms other than strictly GPS signals. For example, in some embodiments, the location may be fully or partially determined based on the signals of the wireless network interface 306. For example, location may be broadly determined by knowing the location of a particular tower with which the wireless network interface 306 or cellular transceiver 304 is communicating. In other cases, location may be determined by triangulation if multiple towers are in communication range of the wireless network interface 306. In some cases, the determination of location based on the wireless communication network is performed by the processor of computer system 300 coupled to onboard device 118, but in other cases the tower information is sent to the operations center 100 to perform the bulk of the location calculations.

In another embodiment, location tracking may be accomplished by way of cellular signal triangulation. Still referring to FIG. 3, the onboard device 118 may further comprise a cellular transceiver 304, where the cellular transceiver 304 may communicate with nearby cellular towers in order to determine location by way of cellular signal triangulation.

In some cases, the location determined by the onboard device 118 may only be a position on the face of the earth, for example, latitude and longitude. The operations center 100, receiving a stream of locations from the onboard device 118, may correlate to streets and addresses. In other cases, the onboard device 118 may have sufficient memory and computing functionality to not only determine position in a latitude and longitude sense, but also to correlate the positions to cities, streets, block numbers and addresses.

Although the onboard devices 116 and 118 have been described as disablement capable and location tracking devices respectively, either device may be designed and implemented to achieve either of or both functionalities.

Onboard devices 116 and 118 may communicate wirelessly with each other by way of, in one example, wireless network interfaces 202 and 306, respectively. By way of wireless network interfaces 202 and 306, programs executed by the onboard device computer systems may communicate with each other. For simplification purposes, discussion will refer to wireless network interface 306 coupled to onboard device 118; however, wireless network interface 202 may be configured and may operate in a similar way.

Referring still to FIG. 3, the illustrative wireless network interface 306 may have a limited distance over which communication may take place. The range of over which communication may take place need not extend beyond the inside of the vehicle 114, where the onboard devices are located. The protocol over which the wireless network interface 306 communicates may likewise take many forms. In one embodiment, the wireless network interface 306 implements a radio frequency (RF) communication protocol (i.e., radio frequency communication by way of electromagnetic waves propagating through the air). For example, the communication may be implemented by way of ZIGBEE® brand network protocols, where the ZIGBEE® trademark is owned by Zigbee Alliance; or a Bluetooth communication protocol.

In another embodiment, communication between the onboard devices 116 and 118 is audible, sub-audible, or super-audible. For example, a microphone 308 (illustratively shown as part of onboard device 118) may couple to one or either of the onboard devices and receive an acoustic signal emitted from the other onboard device, such as speaker 204 (illustrative shown as part of onboard device 116) which can be recognized and analyzed by computer systems based on frequencies above, below, and within the audible range. In yet another embodiment, the two onboard devices may be connected by way of a hardwired connection (e.g., an Ethernet network).

Regardless of how the onboard devices communicate with each other, communication between the two devices may be indicative of two operable systems. In other words, as long as the devices are communicating with each other, there will be no alert sent related to suspected tampering.

If a driver tampers with one of the onboard devices, such as by removing the device, and thus breaks or severs the communication between onboard devices 116 and 118, the system may recognize that one or both of the onboard devices has been tampered with, and one of the onboard devices, such as onboard device 118, may send an indication of the last known location of vehicle 114 to the operations center 100 or to a third party, such as administrative agent 106. The indication of last known location may double as both an indication of tampering, and also as a way to aid the lending institution or third party in locating the vehicle.

Furthermore, onboard device 116 may be, in part, a starter relay replacement device, and thus may act as an operational starter relay when the onboard device 118 is communicatively coupled with onboard device 116. In the event communication is lost with the onboard device 118, the onboard device 116 may not provide current to the solenoid in spite of a command to do so, thus disabling the vehicle 114.

In one embodiment, severing the connection between the two onboard devices may also sever the power to one or more of the onboard devices, making it difficult to send off an alert indicative of tampering or an indication of last known location. Thus, one or more of the onboard devices 116 and 118 may be powered by a separate electric power supply 206 and/or 310, respectively. For purposes of simplification, discussion on the electric power supply will be made with reference to onboard device 118 and electric power supply 310; however, electric power supply 206 may be configured and may operate similarly.

Electric power supply 310 may be any device configurable for receiving and distributing electric power through the onboard device 118. Electric power supply 310 may have wires or cables for connecting a source of power. Further, electric power supply may be a battery; capacitor; supercapacitor; a low-voltage shared bus bar; or other electric charge storage device.

In one embodiment, electric power supply 310 is a supercapacitor. In particular, a supercapacitor may have a higher capacitance value per unit volume, with a capacitance value of up to 12,000 farads. Additionally, the supercapacitor may be able tolerate large numbers of rapid charge and discharge cycles. In the event that another source of electric power to one or more of the onboard devices is cut off, the supercapacitor may maintain enough voltage to send an alert to a third party, either directly by way of wireless network 110, or by way of the operations center 100, where, the alert may be an indication of last known location of the vehicle 114. Alternatively, for example, if power is cut off from onboard device 116 due to being removed from or disconnected from the vehicle 114, onboard device 116 may send a signal indicative of power loss (and thus potential tampering) to onboard device 118, requesting an alert be sent to the operations center or a third party. In order to reduce the amount of battery power needed for the onboard devices to communicate with one another, or for the onboard devices to communicate with remote locations, communications related to operability may be sent at periodic, as opposed to continuous, intervals. For example, the onboard devices may communicate with each other when the ignition system of the vehicle is activated. In another example, the onboard devices may communicate with each other every hour.

In the above discussion, onboard device 116 is described as having the capability to selectively disable the vehicle from a command issued from the operations center 100. Furthermore, onboard device 118 has been described as having the capability to track the location of the vehicle through a plurality of location tracking devices and methods, as well as having the capability to send a last known location indication to a third party when communication with the onboard device 116 has been broken. In another embodiment, however, onboard device 116 may also have the capability to track location, and send off a last known location indication if tampering has occurred. Thus, in this alternative embodiment, both onboard devices have the capability to send off a last-known indication of location if power to the other onboard device has been cut.

Although the above description has discussed ascertaining whether tampering has occurred between two communicatively coupled onboard devices, any number of onboard devices may be contemplated. Furthermore, although the above discussion refers to at least two onboard devices communicatively coupled, it is also possible that two or more onboard devices are coupled by a hardwire connection, such as electrical wires or cables.

Figure 4:
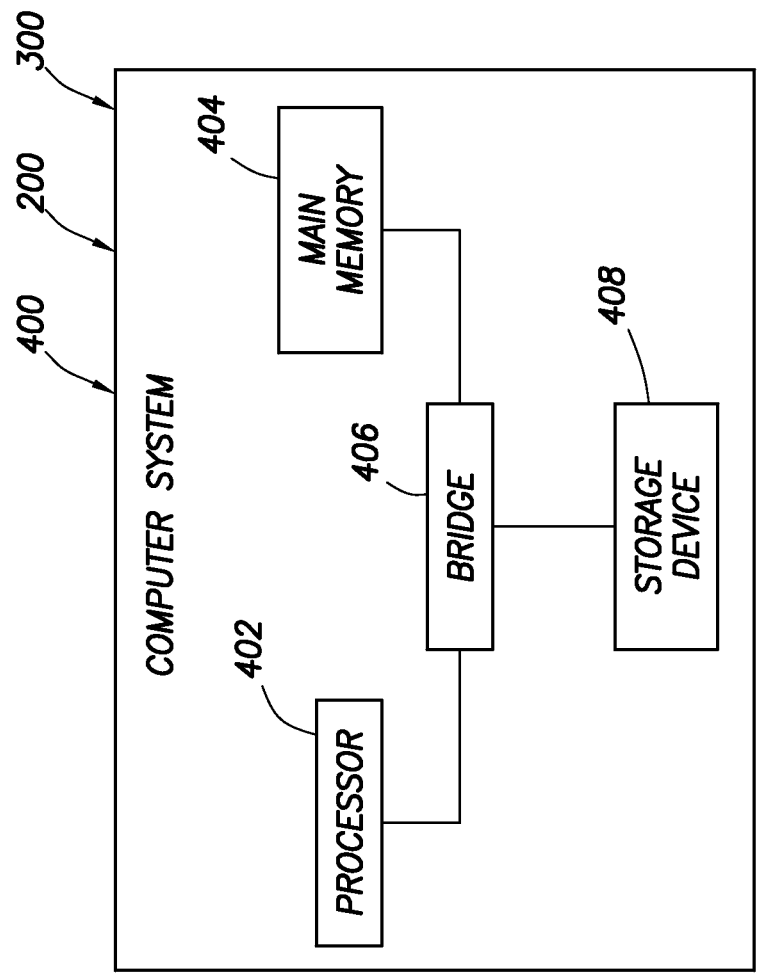
FIG. 4 shows, in block diagram form, a computer system in accordance with at least some embodiments.

FIG. 4 shows a computer system 400, which is illustrative of a computer system upon which the various embodiments may be practiced. The computer system 400 may be illustrative of, for example, computer system 200 coupled to the onboard device 116. In another embodiment, the computer system 400 may be illustrative of, for example, computer system 300 coupled to the onboard device 118. In yet another embodiment, computer system 400 may be illustrative of processor 102. The computer system 400 comprises a processor 402, and the processor couples to a main memory 404 by way of a bridge device 406. Moreover, the processor 402 may couple to a long term storage device 408 (e.g., a hard drive, solid state disk, memory stick, optical disc) by way of the bridge device 406. Programs executable by the processor 402 may be stored on the storage device 408, and accessed when needed by the processor 402. The program stored on the storage device 408 may comprise programs to implement the various embodiments of the present specification, such as sending an indication of the last known location of vehicle 114 in the event of device tampering. In some cases, the programs are copied from the storage device 408 to the main memory 404, and the programs are executed from the main memory 404. Thus, the main memory 404, and storage device 408 shall be considered computer-readable storage mediums.

Figure 5:
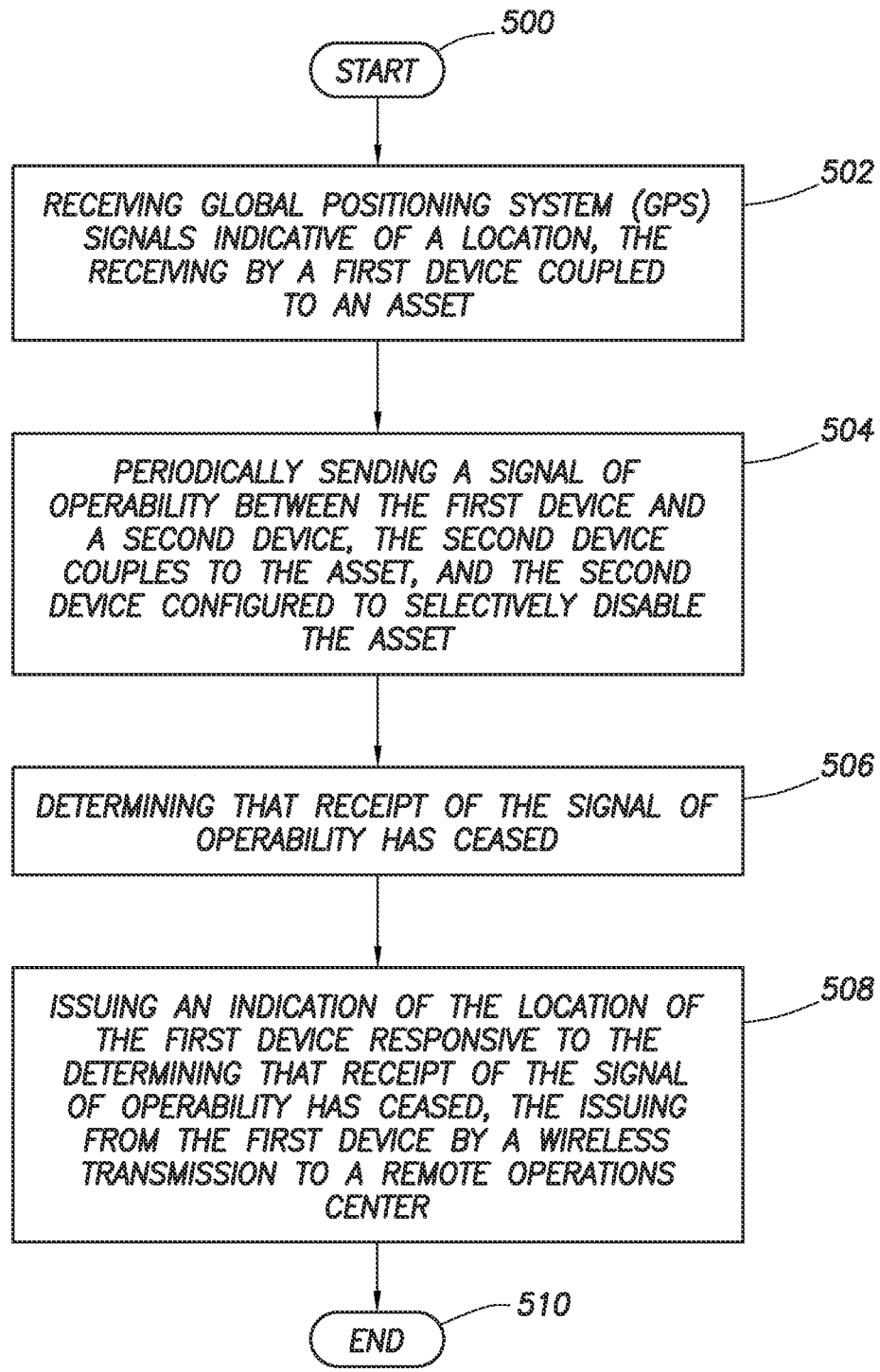
FIG. 5 shows a flow diagram depicting an overall method in accordance with at least some embodiments.

A method of remote tamper detection will now be discussed in more detail. FIG. 5 shows a flow diagram depicting an overall method of detecting whether tampering has occurred with respect to location tracking and disablement devices. The method starts (block 500) by receiving Global Positioning System (GPS) signals indicative of a location, the receiving by a first device coupled to an asset (block 502). The method moves to periodically sending a signal of operability between the first device and a second device, the second device coupled to the asset, and the second device configured to selectively disable the asset (block 504); determining that receipt of the signal of operability has ceased (block 506); and issuing an indication of the location of the first device responsive to the determining that receipt of the signal of operability has ceased, the issuing from the first device by a wireless transmission to a remote operations center (block 508). Thereafter, the method ends (block 510).

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment," "an embodiment," "some embodiments," "various embodiments," or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. For example, the various embodiments have been described in terms of detecting tampering of a remote location tracking device. This context, however, shall not be read as a limitation as to the scope of one or more of the embodiments described—the same techniques may be used for other embodiments. It is intended that the following claims be interpreted to embrace all such variations and modifications.

We claim:

1. A method comprising:
   receiving signals indicative of a location, the receiving by a first device coupled to an asset;
   periodically sending a signal of operability between the first device and a second device, the second device coupled to the asset, and the second device configured to selectively disable the asset;
   determining that receipt of the signal of operability has ceased; and
   issuing an indication of the location of the first device responsive to the determining that receipt of the signal of operability has ceased, the issuing from the first device by a wireless transmission to a remote operations center.

2. The method of claim 1 wherein sending the signal of operability further comprises sending the signal when an ignition system of the asset is activated.

3. The method of claim 1 wherein issuing the indication of the location of the first device further comprises issuing an alert indicative of tampering with at least one selected from the group consisting of: the first device; and the second device.

4. The method of claim 1 wherein sending the signal of operability further comprises sending the signal by way of at least one selected from the group consisting of: a radio frequency transmission; an acoustic transmission; and a hardwire connection.

5. The method of claim 1 wherein the asset is a vehicle.

* * * * *